United States Patent [19]

Murakami et al.

[11] Patent Number: 4,840,255
[45] Date of Patent: Jun. 20, 1989

[54] DISC BRAKE

[75] Inventors: Hideto Murakami, Hatano; Terukiyo Kitamura, Tokyo, both of Japan

[73] Assignee: Nissan Motor Co., Ltd., Yokohama City, Japan

[21] Appl. No.: 51,187

[22] Filed: May 18, 1987

Related U.S. Application Data

[63] Continuation of Ser. No. 833,141, Feb. 26, 1986, abandoned.

[30] Foreign Application Priority Data

Feb. 28, 1985 [JP] Japan ............................ 60-28599[U]

[51] Int. Cl.$^4$ ............................................. F16D 65/20
[52] U.S. Cl. ............................ 188/73.35; 188/73.31
[58] Field of Search ............ 188/73.35, 73.36, 73.37, 188/73.38, 73.43, 73.44, 73.45, 73.39, 72.4, 73.31, 73.42

[56] References Cited

U.S. PATENT DOCUMENTS

| 4,410,070 | 10/1983 | Hagiwara et al. | 188/73.36 |
| 4,418,797 | 12/1983 | Fujimori | 188/73.37 |
| 4,485,897 | 12/1984 | Kawaguchi et al. | 188/73.39 |

FOREIGN PATENT DOCUMENTS 54-38468  8/1977  Japan.
54738  4/1982  Japan ............................ 188/73.45

Primary Examiner—George E. A. Halvosa
Attorney, Agent, or Firm—Foley & Lardner, Schwartz, Jeffery, Schwaab, Mack, Blumenthal & Evans

[57] ABSTRACT

Herein disclosed is a floating caliper type disc brake which can solve or at least minimize the uncomfortable brake noise. In order to achieve this noise reduction, the caliper has three nonsymmetrically arranged finger portions for pressing an outer brake shoe against the face of the disc rotor.

10 Claims, 4 Drawing Sheets

DISC BRAKE

This application is a continuation of application Ser. No. 833,141, filed Feb. 26, 1986, now abandoned.

BACKGROUND OF THE INVENTION

1. Field of the Invention

The present invention relates to in general a disc brake, and more particularly to a floating caliper type disc brake which is designed to reduce the brake noise.

2. Description of the Prior Art

Hitherto, various kinds of disc brakes have been proposed and put into practical use in an automobile field. However, due to their inherent constructions, some of them have suffered from the drawback that particularly after long use of them, uncomfortable brake noise tends to be produced during braking operation of the vehicle.

SUMMARY OF THE INVENTION

It is therefore an essential object of the present invention to provide an improved floating caliper type disc brake which can solve or at least minimize the brake noise.

According to the present invention, there is provided a disc brake comprising: a disc rotor; a carrier connected to a fixed member, the carrier including: two spaced arm portions each straddling a peripheral portion of the disc rotor, with each of the arm portions including: a first and second end portion, and an inner side. A base portion is positioned at one side of the disc rotor and is connected to the first end portions of each of the arm portions and a bridge portion is positioned at the other side of the disc rotor and is connected to the second end portions of each of the arm portions. A caliper is slidably mounted to the carrier so that the caliper is slidable in a direction perpendicular to the major surfaces of the disc rotor. The caliper includes a bridge portion straddling the periphery of the disc rotor, a base portion positioned at one side of the disc rotor and a holder portion positioned at the other side of the disc rotor. The holder portion comprises: first, second and third finger portions which are arranged in this order on an imaginary plane which is parallel to the other face of the disc rotor. The first and second finger portions are of a different size and configuration from the third finger portion and the pitch between the first and second finger portions is greater than the pitch between the second and third finger portions. The disc brake further comprises two identical piston units which are mounted parallel to the base portion of the caliper; an inner brake shoe movably mounted between one side of the disc rotor and each of the piston units so that upon operation of the piston units, the piston units press the inner brake shoe against one face of the disc rotor. The inner brake shoe includes opposed ends which are slidably engaged with the inner side of each of the arm portions of the carrier respectively. An outer brake shoe is movably mounted between the other side of the disc rotor and the holder portion so that upon operation of the piston units, the piston units move the caliper and thus the holder portion and the outer brake shoe. The outer brake shoe makes contact with the other face of the disc rotor. The outer brake shoe including opposed ends which are slidably engaged with the inner side of each of the arm portions of the carrier respectively.

BRIEF DESCRIPTION OF THE DRAWINGS

Other objects and advantages of the present invention will become apparent from the following description when taken in conjunction with the accompanying drawings, in which:

FIG. 5 is a view showing the vibration of three finger portions of a caliper of the disc brake of the first embodiment;

FIG. 6 is a view similar to FIG. 4, but showing a second embodiment of the present invention;

FIG. 7 is a view similar to FIG. 4, but showing a third embodiment of the present invention; and FIG. 8 is a view similar to FIG. 4, but showing a fourth embodiment of the present invention.

DESCRIPTION OF A CONVENTIONAL DISC BRAKE

Prior to describing the present invention, a conventional disc brake 10 will be described with reference to FIGS. 1 to 3 in order to clarify the task of the present invention.

Figure 1:
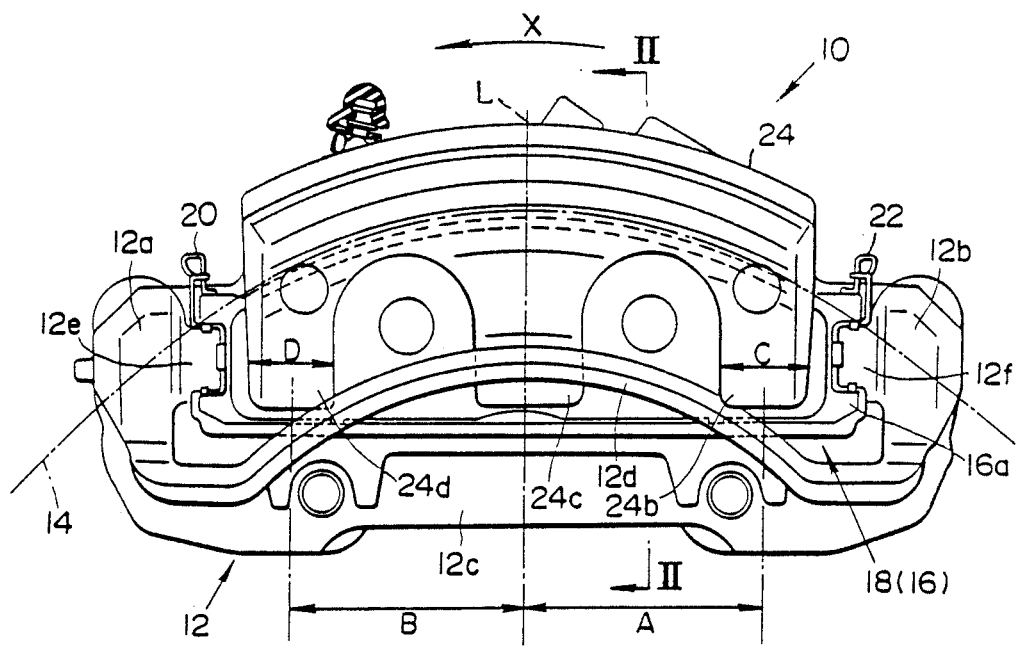
FIG. 1 is a front view of a conventional floating caliper type disc brake to which the present invention is applicable.
Figure 2:
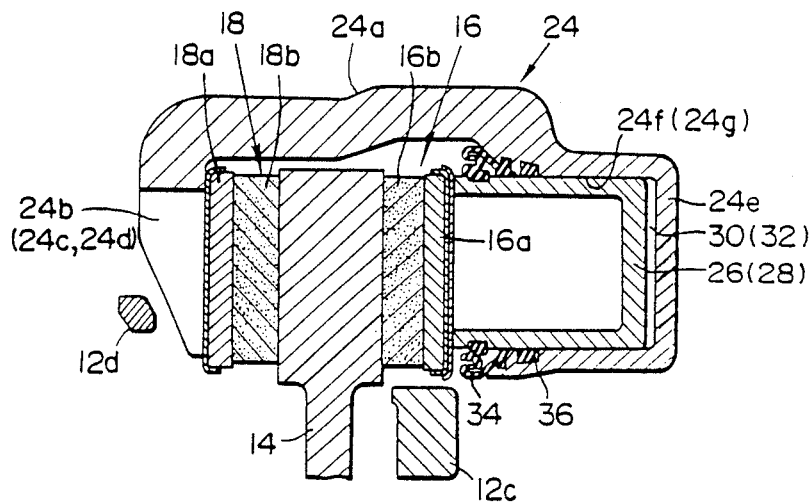
FIG. 2 is a sectional view of the conventional disc brake, which is taken along the line II—II of FIG. 1.
Figure 3:
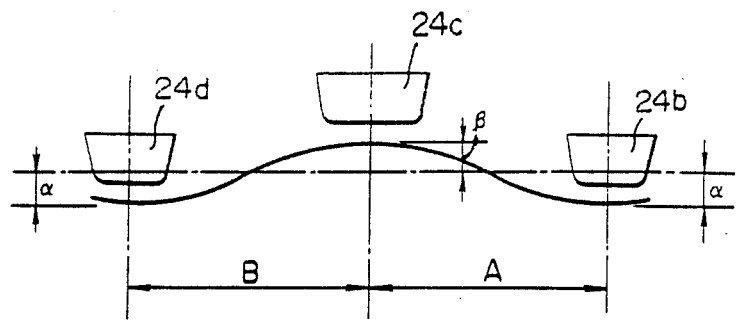
FIG. 3 is a view showing the vibration of three finger portions of a caliper of the conventional disc brake.

Referring to FIGS. 1 to 3, there is shown the conventional disc brake 10 to which the concept of the present invention can be practically applied.

The conventional disc brake 10 comprises a caliper carrier 12 (or torque receiver) which is connected to a suitable fixed portion of a motor vehicle. The carrier 12 is generally in the form of a rectangular frame with a rectangular opening and put over the peripheral portion of a disc rotor 14 having the same exposed through the rectangular opening of the carrier 12. The disc rotor 12 is coaxially fixed to a wheel hub (not shown) of a road wheel to rotate therewith.

The carrier 12 comprises two spaced arm portions 12a and 12b each straddling the peripheral portion of the disc rotor 14, a thickset base portion 12c extending along one face (viz., the outboard face as viewed in FIG. 1) of the disc rotor 14 to connect the arm portions 12a and 12b, and a thin curved portion 12d extending along the other face (viz., the inboard face as viewed in FIG. 1) of the disc rotor 14 to connect the arm portions 12a and 12b. The thickset base portion 12c is connected to the fixed part of the vehicle body by suitable connecting means, such as, bolts. It is to be noted that the arrow X indicates the direction in which the disc rotor 14 rotates when the associated motor vehicle runs forward.

The two arm portions 12a and 12b of the carrier 12 are respectively formed with guiding ridges 12e and 12f which face toward each other. Inner and outer brake shoes 16 and 18 are supported by the guiding ridges 12e and 12f in a manner to be movable in a direction perpendicular to the major faces of the disc rotor 14. Each brake shoe 16 or 18 comprises a metal back plate 16a or 18a which has at the longitudinal both ends recesses (no numerals) which are slidably engaged with the guiding ridges 12e and 12f of the carrier 12, and a brake pad 16b or 18b which is tightly fixed to the corresponding back plate 16a or 18a. As will be seen from FIG. 2, the inner and outer brake shoes 16 and 18 are arranged to put therebetween the peripheral portion of the disc rotor 14. Denoted by numerals 20 and 22 are springs which function to stably and resiliently support the brake shoes 16 and 18 to the carrier 12. That is, with the biasing force of each spring 20 or 22, centering of each brake shoe 16 or 18 relative to the guiding ridges 12e and 12f is achieved.

The disc brake 10 further comprises a caliper 24 which is mounted to the carrier 12 in a manner to straddle the peripheral portion of the disc rotor 14. A guide means is arranged between the carrier 12 and the caliper 24 so that the caliper 24 is movable relative to the carrier 12 in a direction perpendicular to the major surfaces of the disc rotor 14. U.S. Pat. No. 4,294,336 shows clearly the guide means which is applied to such portion.

The caliper 24 comprises a gently curved bridge portion 24a straddling the periphery of the disc rotor 14 at the position between the two spaced arm portions 12a and 12b of the caliper carrier 12, three spaced finger portions 24b, 24c and 24d extending downward from one end of the bridged portion 24a to a position where the inboard surfaces of the finger portions face the back plate 18a of the outer brake shoe 18, and a thickset base portion 24e extending downward from the other end of the bridge portion 24a to a position where the inboard face of the base portion 24e faces the back plate 16a of the inner brake shoe 16. The inboard surfaces of the three spaced finger portions 24b, 24c and 24d are spaced equally from the major face of the disc rotor 14.

The base portion 24e of the caliper 24 is formed with two parallel cylindrical bores 24f (24g) in which respective pistons 26 and 28 are sealingly and slidably received. The heat portions (viz., the inwardly exposed portions) of the pistons 26 and 28 are in contact with the back plate 16a of the inner brake shoe 26, as shown. Denoted by numeral 30 or 32 is a work chamber into which work fluid (brake oil) is introduced upon braking of the disc rotor 14. Designated by numerals 34 and 36 are piston dust boots and piston seals respectively which are arranged in a known manner. Thus, it will be appreciated that upon application of working fluid to the work chambers 30 and 32, the pistons 26 and 28 are moved leftward in FIG. 2 pressing the inner brake shoe 16 against one face of the disc rotor 14. During this, the caliper 24 is moved rightward (as viewed in FIG. 2) relative to the carrier 12 by receiving a counterforce from the disc rotor 14 to which the inner brake shoe 16 contacts. Thus, upon application of the working fluid, the inner and outer brake shoes 16 and 18 are pressed against the disc rotor 14 to brake the same.

However, the three finger portions 24b, 24c and 24d have a next-mentioned conventional arrangement which induces a drawback which will be described hereinafter. (For ease with which the description can be made, the three finger portions 24b, 24c and 24d of the caliper 24 will be referred to as "first", "second" and "third" finger portions which are arranged in order in the direction of the arrow "X" in which the disc rotor 14 rotates when the associated motor vehicle runs forward).

That is, the first and third finger portions 24b and 24d are arranged symmetrically with respect to the second finger portion 24c. More specifically, the pitch "A" between the first and second finger portions 24b and 24c and the pitch "B" between the second and third finger portions 24c and 24d are equal, and the first and third finger portions 24b and 24c have substantially the same, but mutually reversed, configurations, and the second finger portion 24c is constructed to be symmetrical with respect to an imaginary line "L" which lies at a location mid-way between the axes of the two pistons 26 and 28.

Operation is as follows:

When, upon braking, working fluid is introduced into the working chambers 30 and 32 of the disc brake 10, the two pistons 26 and 28 are moved toward the disc rotor 14 pushing the inner brake shoe 16 against the inboard face of the disc rotor 14, and at the same time, pushing the outer brake shoe 18 against the outboard face of the disc rotor 14 through the caliper 24. With this, the disc rotor 14 is braked inducing braking of the associated motor vehicle.

However, the practical use of the above-mentioned conventional disc brake 10 has induced, particularly after lone use of the same, a brake noise trouble originating from the symmetrical arrangement of the finger portions 24b and 24d. Experiment has revealed the cause of the trouble. That is, as will be seen from FIG. 5, with the symmetrical arrangement of them, at least the first and third finger portions 24b and 24d tend to vibrate sympathetically during braking operation of the disc brake 10. These sympathetical vibrations of the finger portions 24b and 24d cause the outer brake shoe 18 to vibrate markedly thereby producing the undesired brake noise.

DESCRIPTION OF THE INVENTION

In the following, the disc brake of the present invention will be described with reference to FIGS. 4 to 8, which is free of the above-mentioned brake noise trouble.

Figure 4:
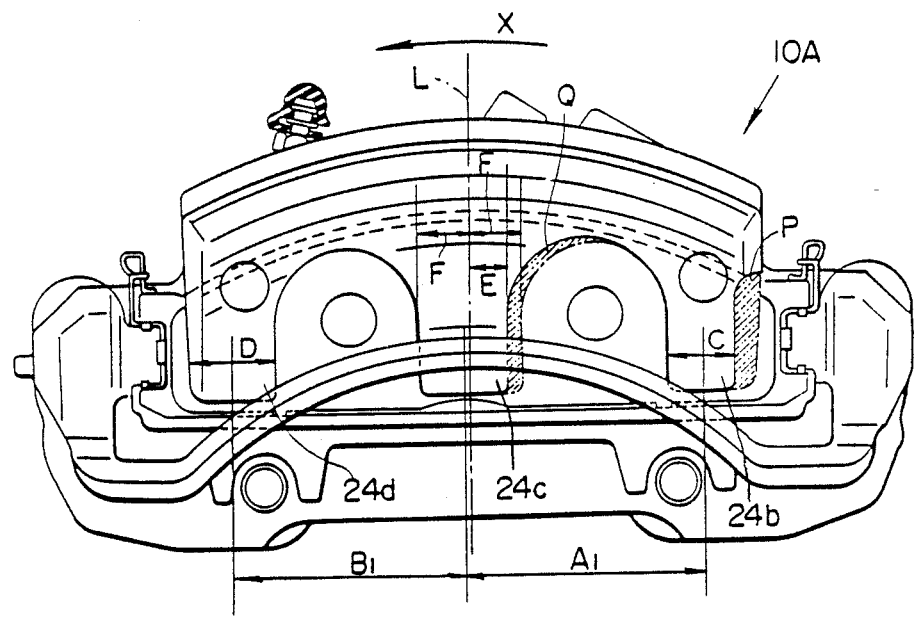
FIG. 4 is a front view of a disc brake of a first embodiment of the present invention.

Referring to FIG. 4, there is shown a first embodiment 10A of the present invention. As will be seen from this drawing, the disc brake 10A has substantially the same construction as the afore-mentioned conventional disc brake 10 except the arrangement of the first, second and third finger portions 24b, 24c and 24d. Thus, only the arrangement of the finger portions will be described hereinnext for ease of description, and the same parts as those of the conventional one will be denoted by the same numerals.

In the first embodiment of FIG. 4, the three finger portions 24b, 24c and 24d are arranged to satisfy the inequality of $A_1 < B_1$. In order to achieve this, as is seen from the hatched sections P and Q of FIG. 4, the leading edge (P) of the first finger portion 24b and the leading edge (Q) of the second finger portion 24c are cut out. With this, the pitch "$A_1$" between the first and second finger portions 24b and 24c becomes smaller than the pitch "$B_1$" between the second and third finger portions 24c and 24d. That is, in the first embodiment, the symmetrical arrangement between the first and third finger portions 24b and 24c is not established. More specifically, the first and third finger portions 24b and 24d are arranged nonsymmetrically with respect to the imaginary line "L".

During braking operation, the following advantageous phenomenon occurs due to the above-mentioned nonsymmetrical arrangement of the first and third finger portions 24b and 24c relative to the second finger portion 24c.

That is, during braking, at least the first and third finger portions 24d and 24d are forced to vibrate in different ways due to the nonsymmetrical arrangement thereof. Thus, as is seen from FIG. 5, these two finger portions 24b and 24d (practically, the three finger portions 24b, 24c and 24d) are forced to have different amplitudes of vibration and have different resonance points with respect to the outer brake shoe 18. That is, during braking, at least one of the first and third finger portions 24b and 24d is forced to vibrate at a frequency other than the resonance frequency of the outer brake shoe 18. Accordingly, the vibration amplitude of the outer brake shoe 18 can be reduced considerably as compared with the afore-mentioned conventional disc brake 10. Thus, the undesired brake noise can be eliminated or at least minimized.

In addition to the above, the following advantageous phenomenon is also given from the first embodiment. That is, because the stiffness of the first finger portion 24b is less than that of the third finger portion 24d due to the thinner construction of the first finger portion 24b than the third finger portion 24d, it is possible to arrange and construct the finger portions in such a manner that the braking pressure applied to the outer brake shoe 18 by the third finger portion 24d is equal to the sum of the braking pressure applied by the first finger portion 24b and a braking pressure produced from the rotational moment of the outer brake shoe 18 due to trailing movement of the same on the rotating disc rotor 14. With this, the outer brake shoe 18 can contact the disc rotor 14 with its braking surface evenly pressed against the face of the disc rotor 14. Thus, in this case, uneven wearing of the brake pad 18b can be avoided.

The advantageous matter of the present invention will be clear from TABLE 1 which compares the sound pressure level of brake noise produced by the above-mentioned first embodiment with that of a conventional disc brake.

TABLE (1)

| Dimension Rate of Finger Portions D/C, F/E | Sound Pressure Level (Max.) |
|---|---|
| 1.0 (FIG. 1) symmetrical | 84 dB |
| 1.3 (FIG. 4) nonsymmetrical | 75 dB |

Wherein:
C . . . width of the first finger portion (24b)
D . . . width of the third finger portion (24d)
F . . . half value of the width of unmodified second finger portion (24c)
E . . . the value obtained by subtracting the width of the cut out part of the second finger portion 24c from the value F.

As is seen from this TABLE, the sound pressure level of the invention is considerably smaller than that of the conventional disc brake 10. Experiment has revealed that when the rate (that is, D/C, F/E) is greater than 1.2, the noise reduction effect is assured.

Referring to FIG. 6, there is shown a second embodiment 10B of the present invention. As is seen from the drawing, in this second embodiment, the trailing edge $R_1$ of the first finger portion 24b and the leading edge $R_2$ of the second finger portion 24c are cut out, so that the pitch $A_2$ is greater than the pitch $B_2$. With substantially the same reasons as described hereinabove, the brake noise is reduced or at least minimized also in this second embodiment.

Referring to FIG. 7, there is shown a third embodiment 10C of the present invention. In this embodiment, the leading edge T and the trailing edge S of the third finger portion 24d are expanded or enlarged so that the pitch $A_3$ is greater than the pitch $B_3$.

Referring to FIG. 8, there is shown a fourth embodiment 10D of the present invention. In this embodiment, the trailing edge U of the second finger portion 24c and the trailing edge S of the third finger portion 24d are expanded or enlarged, so that the pitch $A_4$ is greater than the pitch $B_4$. With substantially the same reasons as described hereinafter, the brake noise reduction is achieved from the third and fourth embodiments.

Although the above-description is directed to a disc brake caliper 24 having only three finger portions 24b, 24c and 24d, the present invention is also applicable to calipers having more than three finger portions.

What is claimed is:

1. A disc brake for reducing brake noise in an automobile, comprising:
   (a) a disc rotor having first and second major surfaces and being adapted for attachment to a wheel of the automobile;
   (b) a carrier for connecting to a fixed member of the automobile, said carrier including:
      (i) two spaced arm portions each straddling a peripheral portion of said disc rotor, each of said arm portions including:
         (1) a first and second end portion, and
         (2) an inner side;
      (ii) a base portion positioned at one side of said disc rotor and being connected to said first end portions of each of said arm portions; and
      (iii) a bridge portion positioned at the other side of said disc rotor and being connected to said second end portions of each of said arm portions;
   (c) a caliper slidably mounted to said carrier so that said caliper is slidable in a direction perpendicular to the major surfaces of said disc rotor, said caliper including a bridge portion straddling the periphery of the disc rotor, a base portion positioned at a first side of said disc rotor and a holder portion positioned at the a second side of said disc rotor, said holder portion comprising:
      (i) first, second and third finger portions which are arranged in this order in the direction of rotation of said rotor when the automobile is moving in a forward direction, said finger portions being arranged on an imaginary plane which is parallel to the second side of said disc rotor, and
      (ii) means for reducing braking noise, comprising at least any one of the finger portions being of a different size and configuration from the other of said finger portions and a pitch between said first and second finger portions which is different than the pitch between said second and third finger portions;
   (d) two identical piston units which are mounted parallel to said base portion of said caliper;
   (e) an inner brake shoe movably mounted between the first side of said disc rotor and each of said piston units so that upon operation of said piston units, said piston units press said inner brake shoe against one face of said disc rotor, said inner brake shoe including opposed ends which are slidably engaged with said inner side of each of said arm portions of said carrier respectively; and (f) an outer brake shoe movably mounted between the second side of said disc rotor and said holder portion so that upon operation of said piston units, said piston units move said caliper and thus said holder portion and said outer brake shoe, said outer brake shoe making contact with the other face of said disc rotor, said outer brake shoe including opposed ends which are slidably engaged with said inner side of each of said arm portions of said carrier respectively;

whereby the three finger portions of said holder portion are positioned asymmetrically with respect to said outer brake shoe.

2. A disc brake as claimed in claim 1, in which said first, second and third finger portions are equally spaced from the other face of said disc rotor.

3. A disc brake as claimed in claim 2, in which said first and third finger portions have mutually different configulations so that the vibrational characteristics of them are different from each other.

4. A disc brake as claimed in claim 1, wherein the leading edge of said second finger portion is cut away with respect to the trailing edge thereof, to provide a nonsymmetrical arrangement between said first and third finger portion with respect to said second finger portion.

5. A disc brake as claimed in claim 1, wherein the width of said first, second and third finger portions, in the direction of rotation of said rotor, is different for each of said finger portions.

6. A disc brake for reducing brake noise in an automobile having a disc rotor attached to a wheel of the automobile and having first and second major surfaces, comprising:

(a) a carrier for connecting to a fixed member of the automobile;

(b) a caliper slidably mounted to said carrier so that said caliper is slidable in a direction perpendicular to the major surfaces of said disc rotor, said caliper including a bridge portion straddling the periphery of the disc rotor, a base portion positioned at a first side of said disc rotor and a holder portion positioned at the second side of said disc rotor;

(c) piston means mounted parallel to said base portion of said caliper;

(d) an inner brake shoe movably mounted between the first side of said disc rotor and said piston means so that upon operation of said piston means, said piston means press said inner brake shoe against one face of said disc rotor;

(e) an outer brake shoe movably mounted between the second side of said disc rotor and said holder portion so that upon operation of said piston means, said piston means move said caliper and thus said holder portion and said outer brake shoe, said outer brake shoe making contact with the other face of said disc rotor; and wherein said holder portion comprises:

(i) first, second and third finger portions which are arranged in this order in the direction of rotation of said rotor when the automobile is moving in a forward direction, said finger portions being arranged on an imaginary plane which is parallel to the second side of said disc rotor, and (ii) means for reducing braking noise, comprising at least any one of the finger portions being of a different size and configuration from the other of said finger portions and the distance between the centers of said first and second finger portions being different than the distance between the centers of said second and third finger portions.

7. A disc brake as claimed in claim 6, wherein the leading edge of said first finger portion is cut away with respect to the trailing edge of said third finger portion, whereby the three finger portions of said holder portion are positioned asymmetrical with respect to said outer brake shoe.

8. A disc brake as claimed in claim 7, wherein the leading edge of said second finger portion is cut away with respect to the trailing edge thereof, to provide a nonsymmetrical arrangement between said first and third finger portion with respect to said second finger portion.

9. A disc brake as claimed in claim 7, wherein the width of said first, second and third finger portions, in the direction of rotation of said rotor, is different for each of said finger portions.

10. A brake disc as claimed in claim 6, wherein said different size finger portions are different in width.

* * * * *